(12) United States Patent
Deng et al.

(10) Patent No.: US 7,896,948 B2
(45) Date of Patent: Mar. 1, 2011

(54) MEMBRANE

(75) Inventors: Liyuan Deng, Trondheim (NO);
May-Britt Hagg, Trondheim (NO);
Taek-Joong Kim, Trondheim (NO)

(73) Assignee: NTNU Technology Transfer AS

( * ) Notice: Subject to any disclaimer, the term of this patent is extended or adjusted under 35 U.S.C. 154(b) by 633 days.

(21) Appl. No.: 11/834,785

(22) Filed: Aug. 7, 2007

(65) Prior Publication Data

US 2008/0078290 A1  Apr. 3, 2008

Related U.S. Application Data

(60) Provisional application No. 60/826,427, filed on Sep. 21, 2006.

(30) Foreign Application Priority Data

Sep. 11, 2006 (EP) .................................. 06254723

(51) Int. Cl.
*B01D 53/22* (2006.01)
*B01D 71/60* (2006.01)
*B01D 71/38* (2006.01)

(52) U.S. Cl. ............... 95/51; 95/45; 96/4; 96/10; 96/11; 96/12; 96/14; 210/640; 210/500.37; 210/500.42

(58) Field of Classification Search ............... 96/4, 6, 96/9, 10, 12, 11, 14; 95/45, 51, 52; 210/640, 210/500.27, 500.37, 500.42; 427/244
See application file for complete search history.

(56) References Cited

U.S. PATENT DOCUMENTS

| 5,849,841 | A  | * | 12/1998 | Muhlebach et al. ............ 525/59 |
| 6,315,968 | B1 |   | 11/2001 | Quinn et al. |
| 2005/0211624 | A1 | * | 9/2005 | Vane et al. .................. 210/500.37 |
| 2007/0051680 | A1 | * | 3/2007 | Vane et al. ........................ 95/45 |

FOREIGN PATENT DOCUMENTS

WO  2005089907  9/2005

OTHER PUBLICATIONS

Deng et al., "PVA/PVAm Blend FSC Membranes for CO2-capture", Aug. 8, 2006, Desalination, vol. 199, pp. 523-524.*
Deng, Liyuan;Kim, Taek-Joong; Haag, May-Britt; PVA/PVAm blend FSC membrane for CO2 capture; Desalination 199 (2006), pp. 523-524.

* cited by examiner

*Primary Examiner* — Jason M Greene
(74) *Attorney, Agent, or Firm* — Gardner Groff Greenwald & Villanueva, PC (57) ABSTRACT

A membrane suitable for separating a gas, in particular carbon dioxide, from a gas mixture containing the gas is provided by a blend of polyvinyl alcohol (PVA) and polyvinylamine (PVAm).

18 Claims, 6 Drawing Sheets

MEMBRANE

This application claims priority upon European Application No. 06254723.7, filed Sep. 11, 2006 and U.S. provisional application Ser. No. 60/826,427, filed Sep. 21, 2006. These applications are hereby incorporated by reference in their entireties for all of their teachings.

This invention relates to a membrane for separating gases from gas mixtures, preferably carbon dioxide from gas mixtures containing the same and to a process for the production of the membrane and use of the membrane to separate gases. In particular, the invention provides a membrane formed from a mixture of polyvinylalcohol (PVA) and polyvinylamine (PVAm).

Scientists have been investigating ways of separating components of industrial gas streams for many years. Recently, with the climate changes being observed due to carbon dioxide emissions, ways of separating carbon dioxide from gas streams to try to reduce the impacts of global warming have been widely researched.

In general, gases such as carbon dioxide are separated from gas mixtures with, for example, methane, nitrogen and/or carbon monoxide by reversible absorption methods employing various chemical and/or physical solvents, or by reversible adsorption in beds of adsorbents (e.g. activated carbon). As conventional processes for treating carbon dioxide are highly energy consuming and depend on the use of additional chemicals, the cost as well as the increased demand for environmental protection enforce more efficient separation processes to evolve. Membrane technology is such a new separation technique. Membrane modules also significantly reduce weight and space requirements of separation equipment.

One option for membrane separation is the use of a facilitated transport membrane, also know as a supported liquid membrane (SLM) with mobile facilitated transport carriers or with fixed carriers. These have been studied for over two decades and are known to have both high permeability of gases and high selectivity. However, for the SLM membranes serious degradation problems, such as evaporation of solution and deactivation of complexing agent (carrier), have restricted their further development and application. Facilitated transport membranes with fixed carrier, such as the PVA/PVAm blend membrane claimed herein are therefore favoured.

Other alternatives to facilitated blend membranes are however known. In J. Membrane Science 163 (1999) 221-227, the separation and recovery of carbon dioxide is achieved using polyethyleneimine/polyvinylalcohol membranes. Such membranes are however very dense and hence particularly thick. They therefore possess poor permeance. In this regard, permeance is a measure of the flow of a gas through the membrane. High permeance represents high flow and therefore rapid gas separation.

In WO2005/089907, a support coated with a cross-linked PVAm was used as a carbon dioxide separating membrane. This membrane suffers however, from a decrease in flux, in particular at higher pressures, when high molecular weight cut off (MWCO) porous supports, e.g. those of MWCO 50,000 or higher, are used. This is believed to be caused by a compaction of the selective membrane layer, which may result in a "filling-in" of the pores of the support structure.

There remains a need therefore to design further gas separating membranes that do not suffer from the problems highlighted above but also possess excellent target gas selectivity and high permeance. The inventors have surprisingly found that a membrane, e.g. a gas separation membrane, formed from a blend of polyvinylalcohol and polyvinylamine exhibits excellent separation properties, excellent mechanical properties and is very stable. Moreover, the membrane does not suffer from compaction or pore blockages (filling in), which occurs when a membrane formed from pure PVAm is used.

Thus, viewed from one aspect the invention provides a membrane suitable for separating a gas from a gas mixture comprising a blend of polyvinyl alcohol and polyvinylamine.

Viewed from another aspect, the invention provides a process for the preparation of a membrane as hereinbefore defined comprising (i) forming a solution of a blend of polyvinylalcohol and polyvinylamine;
(ii) casting said solution, e.g. on a porous support, to form a composite membrane; and optionally
(iii) cross-linking said membrane.

In an alternative process the invention provides a process for the preparation of a membrane as hereinbefore defined comprising (i) forming a solution of a blend of polyvinylalcohol and polyvinylamine;
(ii) immersing a support in said solution to form a composite membrane; and optionally
(iii) cross-linking said membrane.

Viewed from another aspect, the invention provides use of a membrane as hereinbefore defined in the separation of a gas from a gas mixture, e.g. in separating carbon dioxide from a mixture containing the same, e.g. in biogas upgrading.

Gas separating membranes can typically take two forms, supported or unsupported. The present membranes are preferably carried on a support. Suitable supports are known in the art and are ones that are porous to the gas being transported. Suitable supports include polyethersulfone (PES), polyacrylonitrile (PAN), cellulose acetate (CA) and polysulfone (PSO). Such supports are available commercially from suppliers such as Osmonics. In a preferred embodiment the support is PSO.

The combination of the membrane of the invention carried on the support is a composite membrane.

The molecular weight cut off (MWCO) of the support is preferably kept as high as possible, e.g. more than 20,000, preferably more than 30,000, more preferably more than 50,000. In a highly preferred embodiment the MWCO is more than 50,000. It has been surprisingly found that when a membrane of the invention was prepared by blending PVA with PVAm, the problem of "filling in" where pores in the support can become blocked is minimised even if using a high molecular weight support.

The membranes are prepared by forming a solution of the PVA and PVAm. The ratio of these components can vary over a wide range such as 1:50 to 50:1 by weight, preferably 1:25 to 25:1, more preferably 1:10 to 10:1, especially 1:5 to 5:1. It is preferred if the PVAm is present in excess, e.g. 1:2 to 1:8 PVA/PVAm. A highly preferred ratio is about 1:4 by weight (PVA:PVAm).

PVA's of use of the invention are commercially available and may have molecular weights in the range 10,000 to 500,000, e.g. 40,000 to 200,000. Unlike most vinyl polymers, PVA is not prepared by polymerization of the corresponding monomer instead it is prepared by partial or complete hydrolysis of polyvinyl acetate to remove acetate groups. PVA's of use in the invention will generally be at least 80% hydrolysed, e.g. at least 85% hydrolysed.

The polyvinylamine of use in the invention is also available commercially and preferably has a molecular weight in the range 20,000 to 150,000, more preferably less than 75,000, e.g. less than 50,000, especially less than 35,000. The use of low molecular weight polyvinylamine ensures that the membrane of the invention is more flexible and easily processed. However, the molecular weight of polyvinylamine should be high enough to be effectively contained in the polyvinylalcohol chain network.

Polyvinylamines of use in this invention are available commercially, e.g. from 'Polysciences, Inc.' and may be stored in the form of poly(vinylamine) hydrochloride.

The first stage in the formation of the membrane of the invention involves casting a solution of the polymer blend onto the support or alternatively immersion of the support in the solution of polymer blend. A membrane can typically be in the form of a flat sheet or bundle of hollow fibres. Formation of a flat sheet normally involves casting the solution to form the membrane whereas a hollow fibre membrane may involve the dip or spray coating of a hollow fibre support.

The solution of PVA and PVAm is typically aqueous although any suitable polar solvent could be used if it dissolves the polymers in question. The use of water as solvent is cheap and environmentally friendly. The concentration of the polymers (taken together) in the solution may range from 0.1 to 20 wt %, preferably 0.5 to 10 wt %. Ideal membranes have been formed using concentrations of around 0.5 to 2 wt %, e.g. 1 wt %.

To ensure dissolution and thorough mixing, stirring and sonication can be used at this point. The solution can also be filtered.

Casting of the solution is carried out using known techniques. For the manufacture of supported membranes, various options are available for coating supports with thin films. These include dip coating, vapour deposition, spin coating, and spray coating. These techniques will be deemed to be "casting" according to the invention.

The thickness of the formed membrane will vary depending on the concentration of the solution, higher concentration solutions giving thicker membranes. Thickness can be adjusted however using a casting knife.

The thickness of the actual membrane of the invention may be in the range 100 nm to 100 µm, preferably 250 nm to 10 µm, especially 300 nm to 5 µm. Thin membranes tend to have higher permeance values but are also less strong. The presence of the PVA and PVAm in the membranes of the invention provides them with an excellent balance however, of strength and permeance.

The thickness of the support on which the membrane can be carried can vary although this may be of the order of 100 to 500 µm, e.g. around 200 µm.

After formation of the membrane the solvent is removed, e.g. by evaporation. This can be achieved using gentle heat if necessary, e.g. less than 50° C.

To avoid any possible loss of membrane forming material into the support it is normal if there is a reasonable difference between the average molecular weight of the PVAm and the molecular weight cut-off of the support structure. Such a difference may be larger than about 10,000, such as larger than about 15,000, for example larger than about 20,000.

However, the PVA in the PVAm/PVA blend membrane offers an efficient chain network and this can be formed using relatively low molecular weight PVA. In this membrane therefore, the molecular weight of PVAm may be lower than the MWCO of its support.

The formed membrane can then be cross-linked if desired. Cross-linking could be affected chemically using cross-linking agents such as glutaraldehyde or ammonium fluoride but it is preferably affected simply using heat. Suitable cross-linking conditions encompass heating to 50 to 150° C., e.g. 80 to 120° C.

The resulting membrane acts as a fixed site carrier (FSC) for gas, e.g. carbon dioxide, transport due to the high concentration of amino groups in the matrix of PVA. The presence of the PVA gives rise to a membrane that is stronger mechanically and more stable over a larger pressure range and less sensitive to changes in humidity.

As noted below in the Examples, the membranes of the invention have excellent mechanical strength evidence by the fact that a very thin membrane (~0.5 µm) can be formed on a porous support with high MWCO (~50,000) and can resist high pressure without 'filling-in' problem (at least 15 bar).

Tests have shown that membranes of the invention can be used for at least 800 hours without any significant loss of activity and this forms a further aspect of the invention.

The membranes of the invention operate most effectively when they are humid. Before use of the membranes therefore, they may be swelled in the presence of water, e.g. in the form of vapour. Ideally, the membranes of the invention should operate in a humid environment, e.g. at least 75% relative humidity.

The process for the preparation of the membranes of the invention therefore preferably further comprises a step of contacting the membrane with water, e.g. with water vapour and/or operating the membrane in a humid environment.

Figure 6:
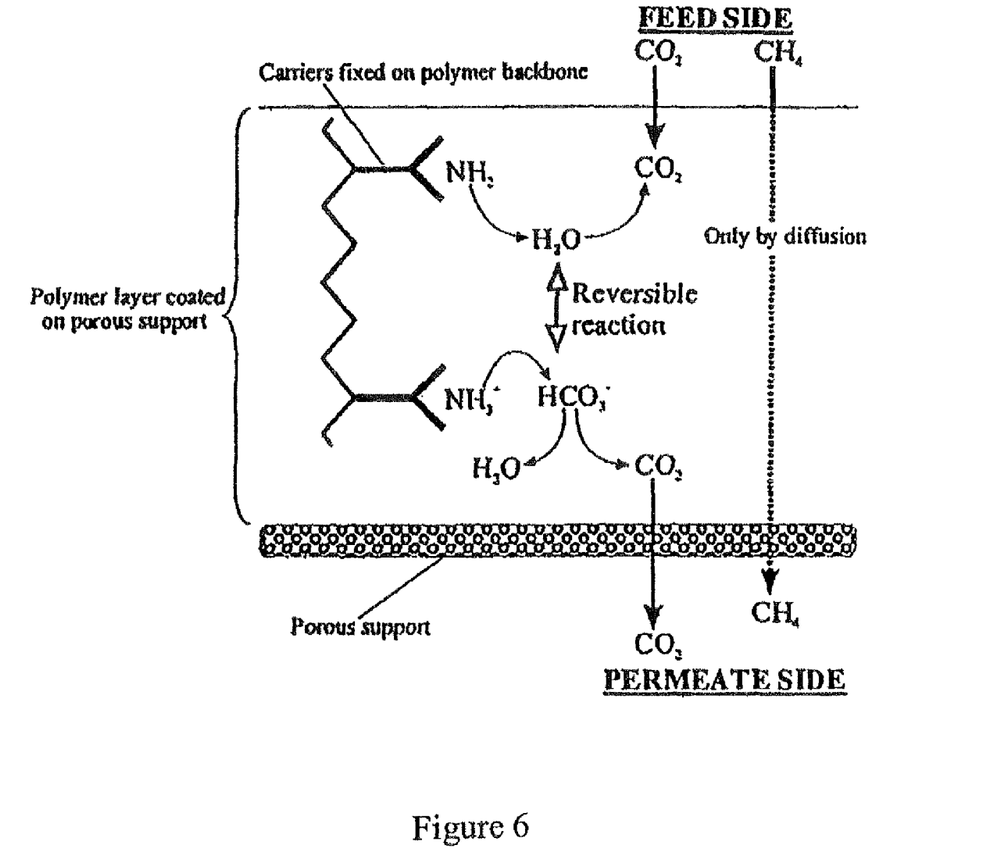
FIG. 6 shows the transport of carbon dioxide across a membrane of the invention.

It is envisaged that the presence of water vapour in the membrane facilitates carbon dioxide flux across the membrane as shown in FIG. 6.

Gases that can be separated from gas mixtures using the membranes of the invention include carbon dioxide with various components such as nitrogen, methane, carbon monoxide, volatile organic compounds or hydrogen. In use, the gas mixture to be separated will flow across the membrane under pressure, typically at temperatures in the range of 10 to 60°, preferably at room temperature (20 to 35° C.). Since the membranes may be wetted, it is preferable if the temperature of gas separation is less than the boiling point of water at the pressure in the system.

Preferably, the membrane is used to separate carbon dioxide from nitrogen or methane. In this latter regard, the membranes of the invention may therefore have applications in the field where these gases are present in mixtures such as flue gas, biogas upgrading or possibly sweetening of natural gas.

The pressure at which the gas mixture is applied to the membrane is important as it affects the flow across the membrane and potentially the selectivity thereof. Feed pressures may therefore be in the range of 1.0 to 70 bars, e.g. 1.0 to 20 bars, especially 2 to 15 bars. The membranes of the invention are especially useful for feed pressures of at least 3 bars, preferably at least 4 bars, especially at least 5 bars, more especially at least 10 bars.

The membranes of the invention preferably exhibit selectivities of at least 20, more preferably at least 50, especially at least 100, most especially at least 150. Selectivity is measured as described in the examples.

Permeance values in $m^3(STP)/m^2 \cdot h \cdot bar$ are preferably at least 0.1, preferably at least 0.2, especially at least 0.3, most especially at least 0.4.

The invention will now be further described with reference to the following non-limiting examples and figures.

EXAMPLE 1

Membrane Formation

A blend of PVA (90% hydrolysed powder, MW 72,000) and PVAm (MW 25,000) was prepared in the weight ratio 1:4. An aqueous solution of 1 wt % of the blend was formed and thoroughly mixed by stirring and sonication. The solution was filtered and 1.5 g of this solution was cast on a polysulphone support (MWCO 50,000) with a membrane area of 27 cm² area.

The casting solution was evaporated overnight at 45° C. and the resulting membrane cross-linked by heating at 90° C. for one hour.

Permeation Testing

Figure 1:
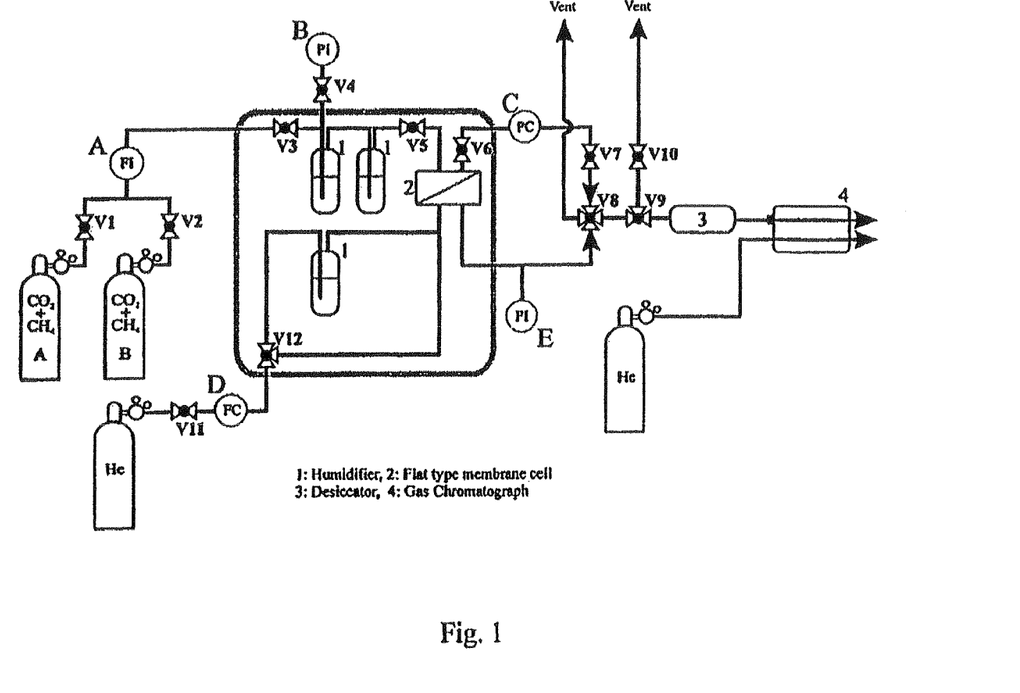
FIG. 1 is a diagram of the experimental set up used to measure permeance.

Permeance of the membranes was measured with an apparatus equipped with a humidifier, see FIG. 1. FIG. 1 shows an experimental setup for gas permeation measurements. The chosen gases may be mixed in any ratios in a gas flow line A, in which flow, pressures and temperature are controlled. The gas mixture is lead to humidifiers in tanks 1 where it bubbles through water, and then to a membrane separation cell 2. Either the retentate stream C, or the permeate stream E, may be lead to a gas chromatograph (GC) 4 for analysis of the composition. The gas is dried by desiccator 3 before going to the GC.

The various gas flows are controlled by valves VI to V12. The abbreviations FI, FC, PI and PC in circles are flow indicator (FI), flow controller (FC), pressure indicator (PI) and pressure controller (PC), respectively. The use of this equipment will be familiar to the skilled person.

The membrane was placed on a porous metal disk in a flat type membrane cell 2 and was sealed with rubber O-rings.

All experiments were conducted at a constant temperature of 25 or 35° C. (experiments run at both temperatures) and the pressure difference between the feed and the permeate sides was 1-15 bar.

The permeance (flux) was calculated in the unit m³(STP)/(m².bar.h). Selectivity for the reported experiments with the current blend membrane was calculated from compositions of gases in feed side and permeate side.

$$\alpha_{mix} = \frac{y_{p,i}/y_{p,j}}{x_{f,i}/x_{f,j}}.$$

Where $y_{i,j}$ and $x_{i,j}$ are the fractions of components i and j on permeate (p) and feed side (f) respectively Results for the membrane of Example 1 with a 10% $CO_2$/$N_2$ mixture are presented in the table below and compared to reported values for similar membranes.

TABLE 1

| Membrane material | Selectivity | Permeance m³(STP)/m² · hr · bar | Feed gas ($CO_2$ vol %) | Ref. |
|---|---|---|---|---|
| Plasma polymerized from diiso-propylamine | 17 | 1.2 | $CO_2/CH_4$ (3.5%) | [2] |
| Poly {2-(N,N-dimethyl) amino ethylmethacrylate} | 130 | $2.7*10^{-3}$ to $2*10^{-2}$ | $CO_2/N_2$ (2.7-58%) | [3] |
| PEI//PVA blend | 130-230 | $2.7*10^{-3}$ | $CO_2/N_2$ (5.8-34%) | [4] |
| PVAm on PSO support | 700-1100 | $8.4*10^{-3}$ | $CO_2$ and $CH_4$ | [1] |
| PVAm/PVA blend | 150-250 | 0.2-0.43 | $CO_2/N_2$ (10%) | — |

[1] T-J Kim, Baoan Li and M-B Hagg, Novel fixed-site-carrier polyvinylamine membrane for carbon dioxide capture, J. Polym. Sci. part B, 42(2004), 426-436
[2] Matsuyama, H., Hirai, K. and Teramoto M, Selective permeation of carbon dioxide through plasma polymerized membrane from diisopropylamine, J. Membr. Sci. 92(1994), 257-265.
[3] Matsuyama, H., Teramoto M. and Sakakura H., Selective permeation of $CO_2$ through poly 2-(N,N-dimethyl) aminoethyl methacrylate membrane prepared by plasma-graft polymerization technique, J. Membr. Sci. 114 (1996), 193-200.
[4] Matsuyama, H., Terada A., Nakadawara T., Kitamura Y. and M. Teramoto M, Facilitated transport of CO2 through polyethylenimine/poly(vinyl alcohol) blend membrane, J Membr Sci 163(1999), 221-227.

Specific comparison with the PEI (polyethylene imine)/PVA blend above is given also in Table 2 and with a PVAm membrane alone in Table 3.

TABLE 2

| Comparisons | PVA/PVAm blend membrane | PEI/PVA blend membrane |
|---|---|---|
| 1. Precursor Polymers | Polyvinyl amine and Poly(vinyl alcohol) | Polyethylenimine and poly(vinyl alcohol) |
| 2. Membrane types | Composite membrane, ultrathin blend selective layer (around 500 nanometers) cast on porous PSO support | dense membrane with thickness of 1000 μm |

TABLE 2-continued

| Comparisons | PVA/PVAm blend membrane | PEI/PVA blend membrane |
|---|---|---|
| 3. Crosslinking methods | 90° C. heated for 1 hour | 140° C. heated for 1 hour |
| 4. Separation performance: | Selectivity: 150-250 - Permeance: 0.43 m³(STP)/m² · h · bar | Selectivity: 130-230 - Permeance: $2.7*10^{-3}$ m³(STP)/m² · h · bar |
| 5. Feed pressure | 2-15 bar | 1-6 atm |

TABLE 3

| Comparisons | PVA/PVAm blend membrane | PVAm membrane |
|---|---|---|
| 1. Precursor Polymers | Polyvinyl amine and Poly(vinyl alcohol) | Self-synthesized with much higher molecular weight (about MW 80,000) |
| 2. Mechanical properties | Stronger mechanical properties (PVA-like) -No filling-in phenomenon happened on MWCO 50,000 PSO support at 15 bar | "Filling-in" or compaction problems happened on MWCO 50,000 PSO support for feed pressures higher than 5 bar. |
| 3. Stability | Less sensitive on humidity changes, broader range of operation conditions | Sensitive to humidity changes |
| 4. Crosslinking methods | 90° C. heated | NH₄F crosslinking agent |

EXAMPLE 2

Feed Pressure Effects

Further films were prepared based on the membrane preparation technique described in Example 1 with certain parameters varied as described below.

TABLE 4

| Sample | Conc of cast soln wt % | MWCO of support | Thickness μm | Crosslinking |
|---|---|---|---|---|
| B-06-3 | 11.5 | 20,000 | 35 | Heat |
| B-06-4* | 2.5 | 50,000 | 7 | NH4F |
| B-06-5* | 1.0 | 50,000 | 0.5-1 | NH4F |
| B-06-6 | 1.0 | 50,000 | 0.5-1 | Heat |

*Filtered before casting

Figure 2:
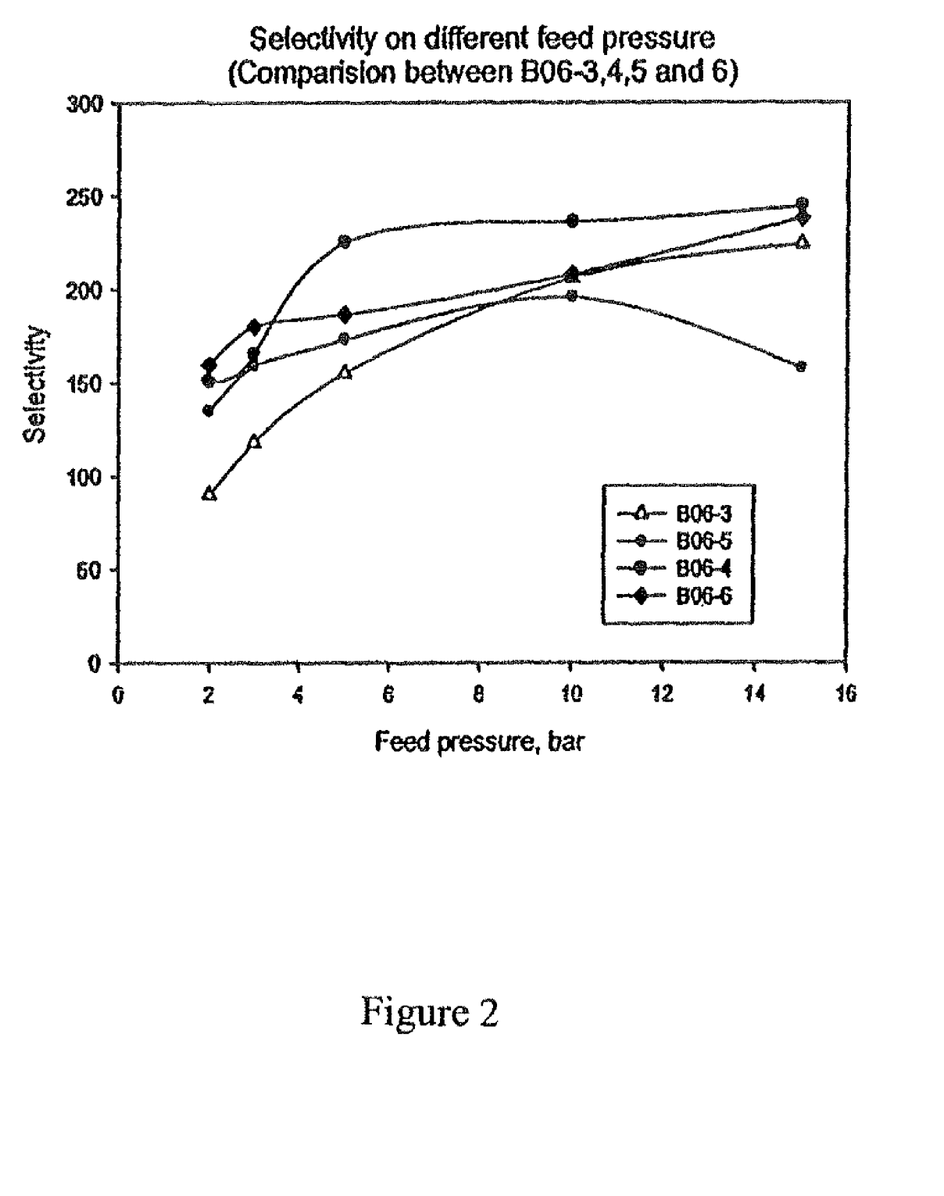
FIG. 2 shows selectivity variation with feed pressure for membranes of the invention.
Figure 3:
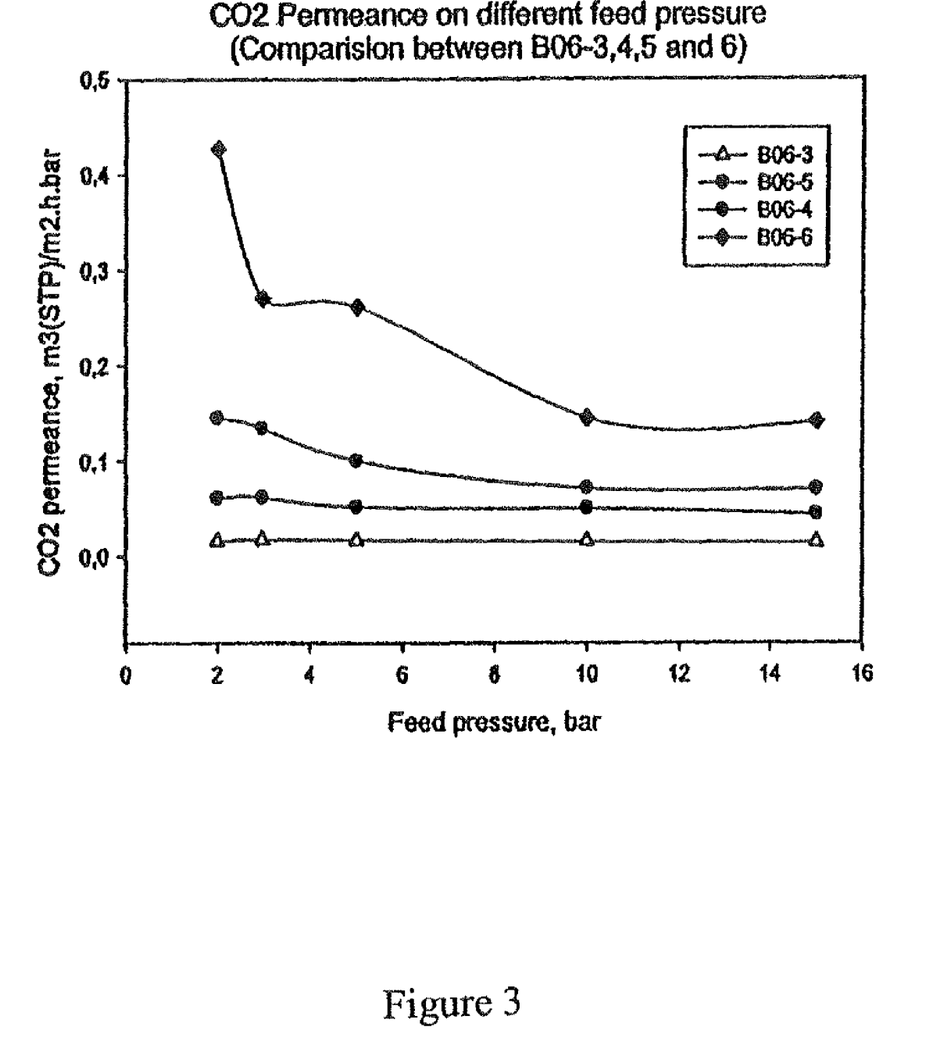
FIG. 3 shows permeance variation with feed pressure for membranes of the invention.

Selectivity and permeance were calculated using the methods described above at varying feed pressures for a 10% $CO_2/N_2$ mixture. Results are presented in FIGS. 2 and 3.

The best results are exhibited by B-06-6 where selectivity of 238 at 15 bars was achieved with a permeance of 0.14 m³(STP)/m².h.bar. At 2 bars, permeance was as high as 0.43 m³(STP)/m².h.bar for a selectivity of 159.

EXAMPLE 3

Figure 4:
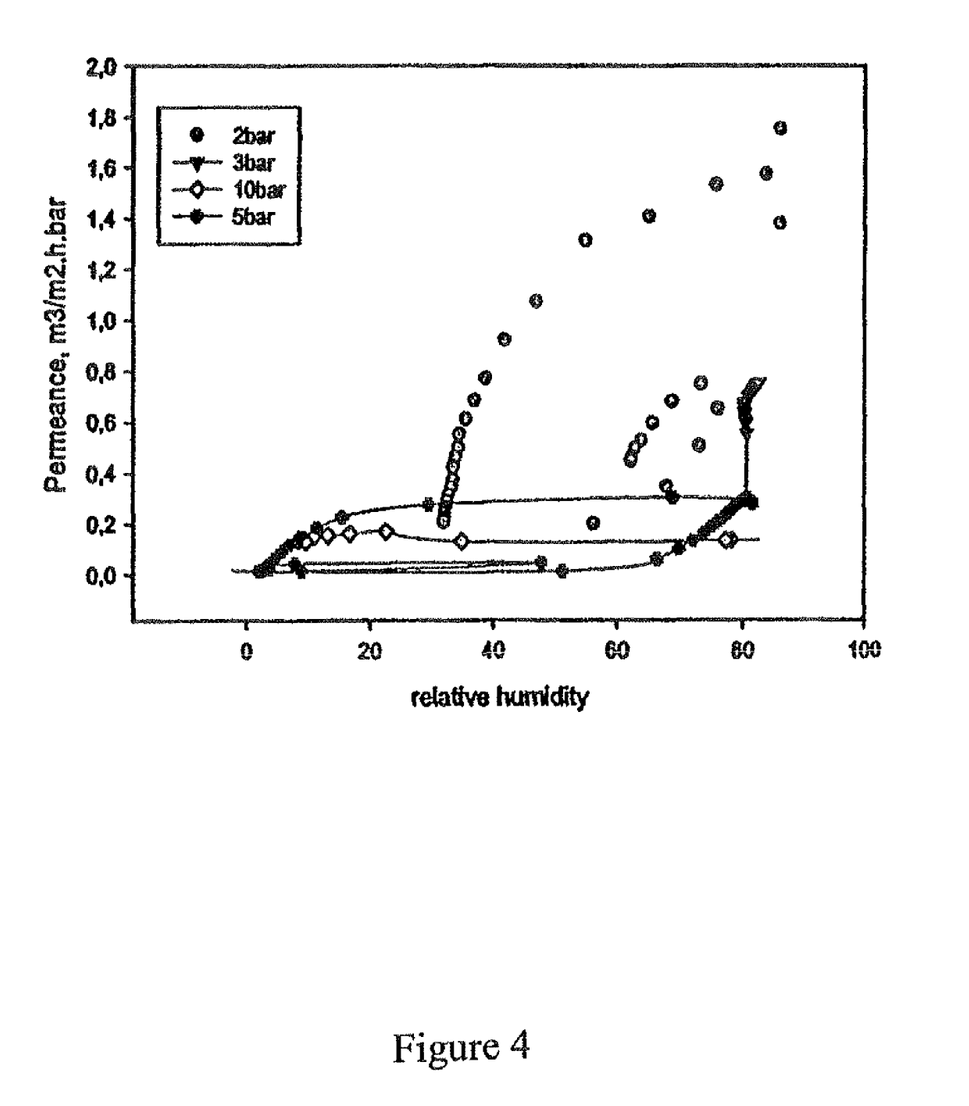
FIG. 4 shows permeance variation with humidity for membranes of the invention
Figure 5:
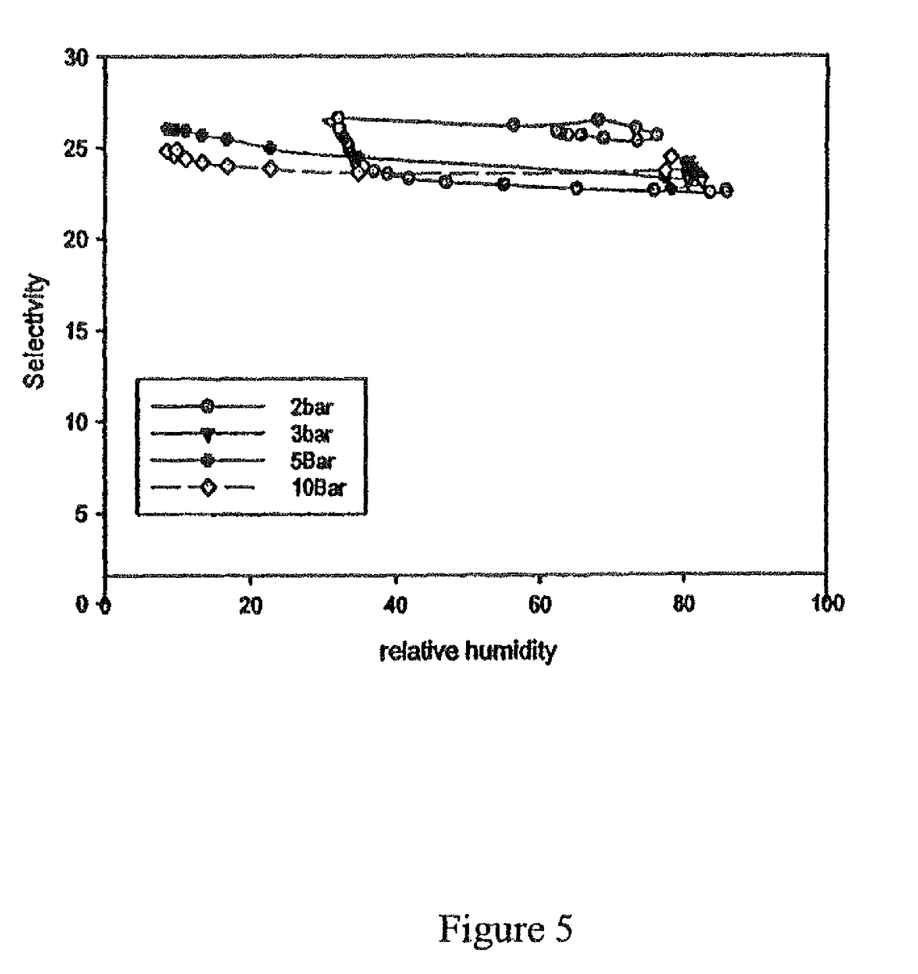
FIG. 5 shows selectivity variation with humidity for membranes of the invention

Membrane B06-5 was also used to separate carbon dioxide from a mixture with methane (10% $CO_2$). Various feed pressures were used (2, 3, 5 and 10 bars) Results are presented in FIGS. 4 and 5 which show also how variation of the humidity and hence water content of the membranes can effect selectivity and permeance.

As will be seen selectivity is not greatly effected by humidity. Humidity increase does however improve permeance.

A high permeance of 1.0 m³(STP)/m².h.bar was achieved at a selectivity of 26.

The invention claimed is:

1. A method for separating carbon dioxide from a gas mixture containing the same comprising exposing the mixture to a membrane comprising a blend of polyvinyl alcohol (PVA) and polyvinylamine (PVAm).

2. The method of claim 1 wherein said mixture comprises carbon dioxide with nitrogen, methane, or other volatile organic gas.

3. The method of claim 1 wherein the gas mixture has a feed pressure of at least 5 bars.

4. The method as claimed in claim 1 wherein the weight ratio of PVA to PVAm is 1:4.

5. The method as claimed in claim 1 wherein the membrane is carried on a support.

6. The method as claimed in claim 5 wherein the support is polysulphone.

7. The method as claimed in claim 1 wherein the membrane has been exposed to water vapour.

8. The method as claimed in claim 5 wherein the support structure is a flat sheet membrane or a hollow fibre membrane.

9. The method as claimed in claim 1 wherein the support has a molecular weight cut-off greater than 20,000.

10. The method as claimed in claim 1 wherein the molecular weight of said polyvinylamine is in the range 20,000 to 150,000.

11. The method as claimed in claim 1 wherein the membrane is cross-linked.

12. The method as claimed in claim 11 wherein the cross-linking reaction is affected using heat.

13. The method as claimed in claim 1 wherein the membrane is produced by the process comprising:
(i) forming a solution of a blend of polyvinylalcohol and polyvinylamine;
(ii) casting said solution to form a membrane and optionally;
(iii) cross-linking said membrane.

14. The method as claimed in claim 1 wherein the membrane is produced by the process comprising:
(i) forming a solution of a blend of polyvinylalcohol and polyvinylamine;
(ii) immersing a support in said solution to form a composite membrane; and optionally
(iii) cross-linking said membrane.

15. The method as claimed in claim 13 wherein the cross-linking step is carried out using heat.

16. The method as claimed in claim 14 wherein the cross-linking step is carried out using heat.

17. The method as claimed in claim 13 further comprising swelling said membrane by exposing it to water vapour.

18. The method as claimed in claim 14 further comprising swelling said membrane by exposing it to water vapour.

* * * * *